(12) United States Patent
Charron (10) Patent No.: US 6,314,307 B1
(45) Date of Patent: Nov. 6, 2001

(54) PORTABLE ELECTRONIC APPARATUS HAVING A DETECTION DEVICE FOR DETECTING A VARIATION OF THE SUPPLY VOLTAGE

(75) Inventor: Didier Charron, Rouillon (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/993,134

(22) Filed: Dec. 18, 1997

(30) Foreign Application Priority Data

Dec. 19, 1996 (FR) .................................. 96 15665

(51) Int. Cl.[7] .............................. H04Q 7/32; G08B 21/00
(52) U.S. Cl. ...................... 455/573; 455/572; 455/117; 455/127; 455/343; 340/661; 340/660; 320/152; 320/162
(58) Field of Search ..................................... 455/127, 117, 455/343, 573, 572, 574; 340/661, 636, 660, 662, 663; 320/152, 162

(56) References Cited

U.S. PATENT DOCUMENTS

| | | | | |
|---|---|---|---|---|
| 3,650,345 | * | 3/1972 | Yardney | 180/65.2 |
| 4,460,870 | * | 7/1984 | Finger | 340/636 |
| 4,740,754 | * | 4/1988 | Finger | 340/636 |
| 4,910,761 | * | 3/1990 | Shimura et al. | 455/573 |
| 4,962,543 | * | 10/1990 | Kuge et al. | 455/572 |
| 5,027,285 | * | 6/1991 | McCartney et al. | 340/660 |
| 5,168,205 | * | 12/1992 | Kan et al. | 320/160 |
| 5,426,690 | * | 6/1995 | Hikuma et al. | 455/572 |
| 5,550,475 | * | 8/1996 | Shafer | 324/433 |
| 5,600,229 | * | 2/1997 | Oh | 320/162 |
| 5,622,789 | * | 4/1997 | Young | 320/152 |
| 5,677,944 | * | 10/1997 | Yamamoto et al. | 455/343 |
| 5,724,651 | * | 3/1998 | Tekahashi et al. | 455/343 |
| 5,726,636 | * | 3/1998 | Hayes, Jr. | 455/572 |
| 5,797,088 | * | 8/1998 | Stamegna | 455/345 |
| 5,898,930 | * | 4/1999 | Terashima et al. | 455/572 |
| 5,923,150 | * | 7/1999 | Umetsu | 320/162 |

* cited by examiner

*Primary Examiner*—Reinhard J. Eisenzopf
*Assistant Examiner*—Eliseo Ramos-Feliciano
(74) *Attorney, Agent, or Firm*—Dicran Halajian (57) ABSTRACT

The invention relates to an electronic apparatus whose power is supplied by a battery (11) having a memory (32) which contains electrically erasable data (32a) and a supply voltage detection device (37) for detecting a variation of the supply voltage (Vbat). The invention notably has for its object to provide a detection device (37) which is capable of instantaneously detecting various voltage levels to cut off the power supply (Vbat) without the contents of the memory (32) being changed and capable of indicating the charging level of a battery (11) or an overload. The invention may be used in portable telephones and other electronic equipment whose power is supplied by a power supply battery.

12 Claims, 6 Drawing Sheets

PORTABLE ELECTRONIC APPARATUS HAVING A DETECTION DEVICE FOR DETECTING A VARIATION OF THE SUPPLY VOLTAGE

BACKGROUND OF THE INVENTION

The invention relates to an electronic apparatus whose power is supplied by a supply voltage, comprising a memory which contains electrically erasable data and a supply voltage detection device for detecting a variation of the supply voltage.

In heavily industrialized countries, a current tendency seeks to miniaturize the dimensions of portable telecommunication equipment intended for the public at large and for current use. The makers of this electronic equipment are thus exposed to heavy competition regarding the weight-to-volume ratio and the range of their apparatus. As the latest integrated circuit technologies currently permit of considerably reducing the volume of the electronic circuits, the range of this portable apparatus has become the factor which restricts this course to miniaturization. Indeed, generally intended for mobile use, this apparatus is fed by power supply batteries whose range is proportional to the weight in a given technology. In consequence, an apparatus fed by a battery is all the lighter as its range is smaller, which explains why the battery of a portable apparatus frequently turns out to be discharged.

Thus, to avoid certain phenomena which are likely to damage the apparatus, it is very important to anticipate during the discharging the instant at which the supply voltage will be cut off. Notably, the mobile radio telephones or other equipment comprising processors and electrically erasable memories of the EEPROM type (Electrically Erasable Programmable Read-only Memory) cannot withstand sudden power cuts. If the power supply is not cut off until its voltage drops below a threshold defined as critical by the manufacturer, the contents of the EEPROMs may be corrupted. In effect, the processor powered by an insufficient voltage no longer controls its addressing system. It runs the risk of writing an erroneous address in the EEPROM and overwriting the data which are found at that address. Data may then be lost, which is very harmful to the use of the radio telephone.

In a known electronic apparatus, a supply voltage detection device is used to periodically sound the supply voltage produced by the battery in order to detect the instant at which said voltage drops below the critical voltage and cut off the power supply so as not to change the data of the EEPROM.

An apparatus comprising such a supply voltage detection device, however, thus has a major drawback that questions its reliability. In effect, based on a periodic sounding technique, the detection precision and thus the reliability of this device directly depend on the sounding period used. As the conventional discharging curve of a battery drops very rapidly towards the end of the discharge, the power supply is frequently cut off which is undetected by the current device of which the sounding period is very large compared to the rapidity with which the voltage drops at the end of the discharge.

Diminishing the sounding period for enhancing the chances to detect the crossing of the critical threshold forms a too expensive solution which necessitates a faster and more powerful processor than that used in the known device.

SUMMARY OF THE INVENTION

The present invention describes a simple and economic solution for largely remedying these drawbacks. The invention notably has for its object to provide a supply power detection device which is more reliable than the known device for detecting the supply voltage, without notably augmenting the complexity of the electronic circuits used. The device according to the invention is furthermore capable of instantaneously detecting the crossing of a voltage threshold defined as critical for cutting off the power supply of the apparatus so as not to change the digital data stored in the EEPROM memory.

Therefore, an apparatus of the type defined in the opening paragraph is characterized in that the detection device for detecting the supply voltage comprises:

a continuous monitoring device for the supply voltage for forming a first signal which indicates a drop of supply voltage, backup means for backing up the data of the memory when said signal appears.

This continuous monitoring device for the supply voltage has the advantage of using the processor only when the supply voltage crosses a fixed threshold. Said processor is thus available for carrying out other operations, notably for managing the communication between the mobile station and the base station in the case of a radio telephone.

A first characteristic feature of the invention according to which an electronic apparatus of the type defined above comprises a supply voltage detection device characterized in that the continuous monitoring device produces a second signal for indicating a supply voltage level provides the advantage of permitting the user to control the charging level of his battery to anticipate the instant at which the battery needs recharging.

A second characteristic feature of the invention according to which the supply voltage detection device characterized in that the continuous monitoring device produces a third signal to indicate an overload provides the additional advantage of preventing the battery from exploding as a result of a power supply being cut off when the third signal appears.

According to another interesting characteristic feature of the invention, an electronic apparatus of the type already mentioned additionally comprising a control element which has at least one interrupt input is characterized in that said signals described above are applied to said interrupt input for respectively generating an interruption of the control element and for triggering an interrupt program in response to said signals.

According to again another characteristic feature of the invention, an electronic apparatus is provided of the type already defined above, characterized in that the continuous monitoring device additionally comprises a comparing device for comparing the value of the supply voltage to set values and to produce said respective signals. This characteristic feature provides a means for defining detection thresholds as a function of the type of battery used, on the one hand, and of the needs of the user on the other hand.

These and other aspects of the invention will be apparent from and elucidated with reference to the embodiments described hereinafter.

BRIEF DESCRIPTION OF THE DRAWING

In the drawings:

FIG. 6 shows:

DESCRIPTION OF THE PREFERRED EMBODIMENT

Figure 1:
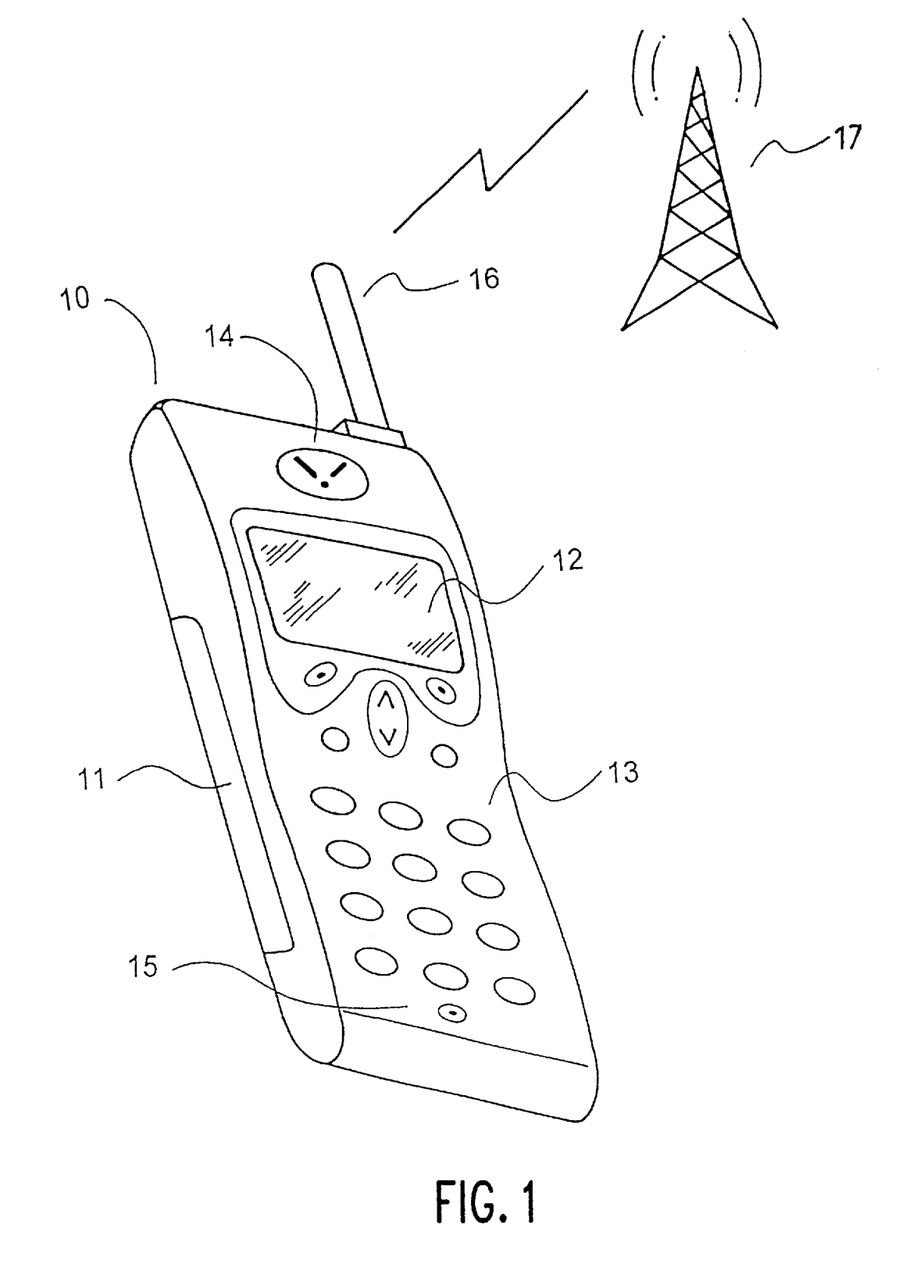
FIG. 1 represents an example of an electronic apparatus according to the invention.

The electronic apparatus shown in FIG. 1 is a radio telephone, but the supply voltage detection device may be applied to any other electronic apparatus whose power is supplied by a supply voltage.

Figure 3:
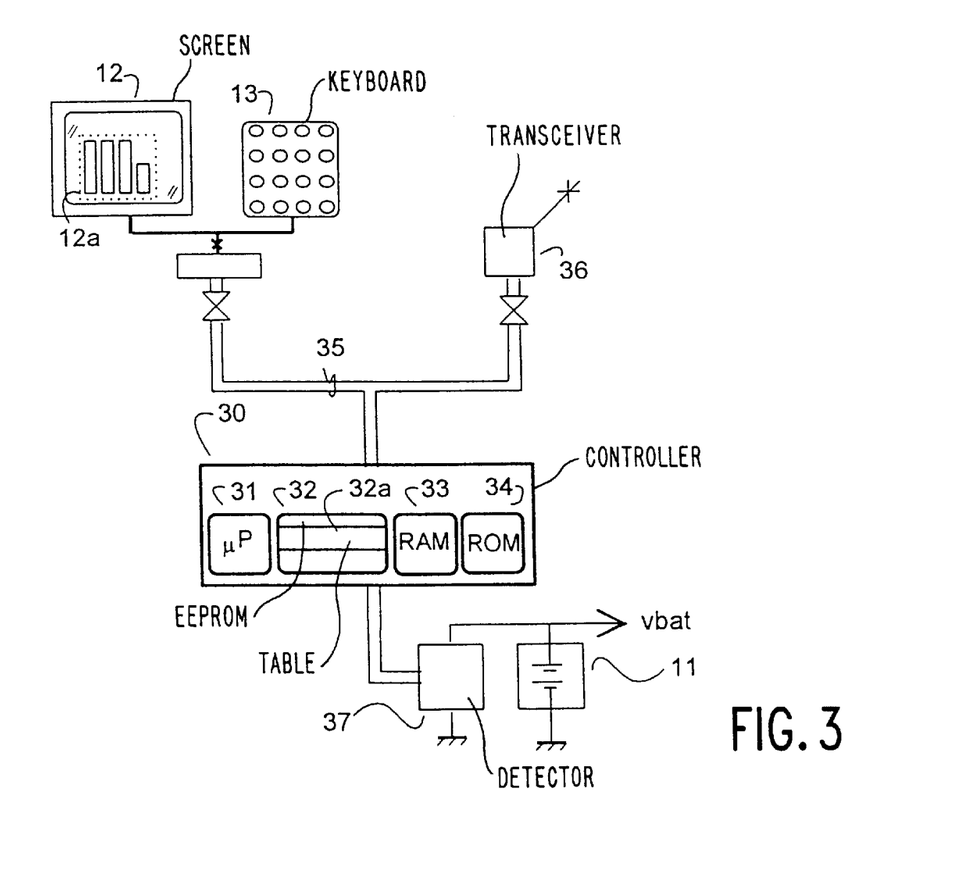
FIG. 3 shows a block diagram of a circuit of the apparatus shown in FIG. 1.

The radio telephone shown in FIG. 1 comprises a housing 10 enclosing a power supply battery 11 and electronic circuits among which that represented in FIG. 3, a screen 12, a keyboard 13, an earphone 14, a microphone 15 and a transceiver device (not shown) cooperating with an antenna 16 for exchanging radio signals with a base site 17.

Figure 2:
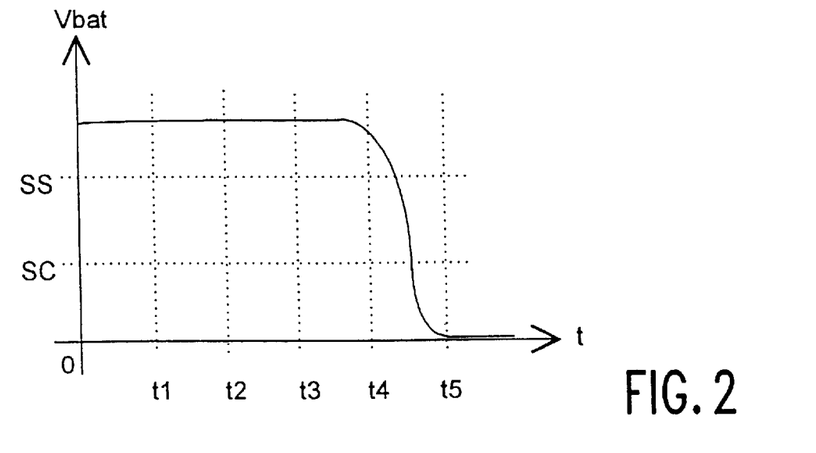
FIG. 2 shows a conventional discharging curve of a power supply battery representing the supply voltage plotted against time.

The discharging curve of the battery (Vbat) plotted against time (t) represented in FIG. 2 shows the acceleration of the lowering of the voltage at the end of the discharge. The instants denoted t1, t2, t3, t4 and t5 represent examples of samples recorded by the periodic sounding device known from the prior art for measuring the supply voltage Vbat.

SS represents the critical threshold whose detection by the prior art device signals a voltage drop Vbat that is large enough to prohibit any writing in the EEPROM memory, because the risks of address errors become too high. SC represents the power cut-off threshold the crossing of which by the supply voltage causes the supply power to be cut off. It is thus indispensable for detecting the threshold SS before the supply voltage crosses the threshold SC.

However, between the samples t4 and t5, the supply voltage curve crosses the power supply cut off threshold SC without the detection device detecting the crossing of the threshold SS because the thresholds SS and SC are crossed between two successive samplings. This example perfectly illustrates the lack of reliability of the known device.

The block diagram of FIG. 3 represents the various elements used in the device according to the invention. The control element 30 is formed by a processor 31, an EEPROM electrically erasable programmable read-only memory 32, a random-access memory 33 RAM and a read-only memory 34 ROM.

The main operation program of the apparatus is stored in the read-only memory 34. The random-access memory 33 is used in parallel with the read-only memory 34 for storing the useful variables. The erasable data are stored in the EEPROM 32 to be modified while the apparatus is being used. The set values corresponding to the voltage thresholds to be detected are arranged in a table 32a of the memory 32 so as to be accessible to the control element 30.

A bus network 35 contains an interrupt bus for transmitting the signals from the keyboard 13 to the processor 31 and a serial IIC (InterIntegrated Circuit) bus intended for the signals in transit between the processor 31, the EEPROM 32 and the screen 12. A transceiver device 36 communicates with the devices described above to connect the user of the radio telephone to the mobile telephone network.

A power supply detection circuit 37 cooperates with the control element 30 and the power supply battery 11 to utilize the supply voltage detection device according to the invention.

Figure 4:
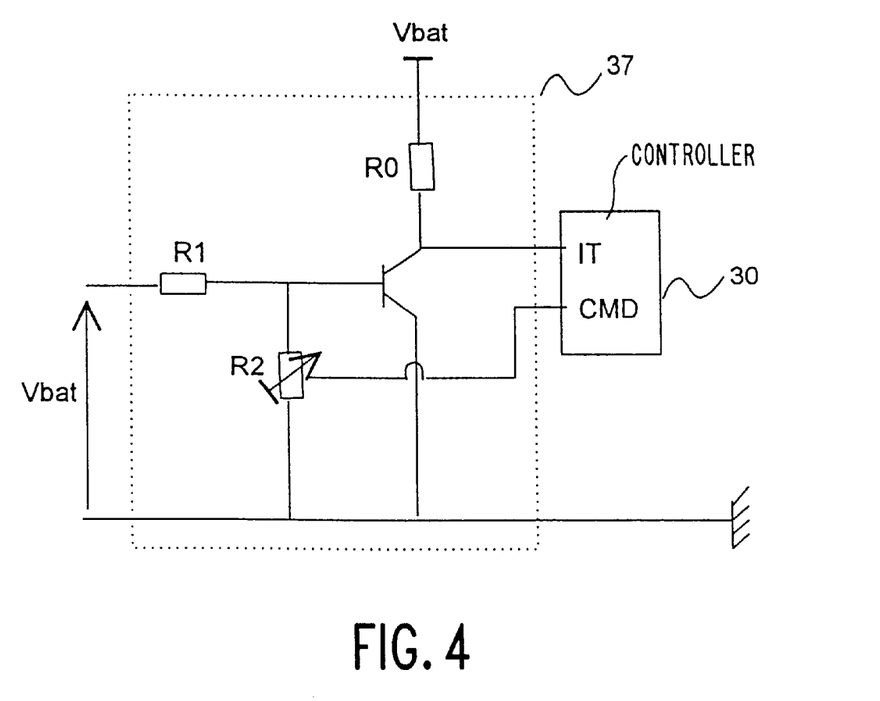
FIG. 4 shows a preferred embodiment of the device according to the invention.

A preferred embodiment of the device 37 is represented in FIG. 4 in the form of an electronic circuit. The power supply battery 11 produces a supply voltage Vbat whose value lies, for example, between 3 and 5.5 volts and which varies as a function of the charge/discharge of the battery. R0 and R1 represent resistive elements whose respective resistances are fixed. R2 is a resistive element whose resistance is variable and is intended to be programmed by the control element 30 as a function of the value of the voltage Vbat and of the voltage threshold one wishes to detect. Such an element R2 whose resistance is digitally programmable is commercially available. For example, a potentiometer DS1804 NV by Dallas Semiconductor could be used.

According to the preferred embodiment of the invention, R2 is controlled by the element 30 of which one output, referred to as a command output CMD, is directly connected thereto for real-time control of the value of its resistance notably as a function of the supply voltage Vbat which occurs in the formula of the voltage divider bridge linking R1 and R2 via the equation:

$$VR2 = Vbat \times R2/(R1+R2).$$

A transistor T arranged as an interrupter allows of generating an interruption IT of the control element 30 notably as a function of the voltage applied to its base, equal to VR2, to trigger the execution of an interrupt program. The fact that the resistive elements R1 and R2 work together with the transistor T realizes the continuous test of the condition of the conduction of the transistor T utilized in the continuous monitoring device for the supply voltage.

As an advantage of the invention, this test takes place naturally and continuously without the intervention of the control element 30. It makes use of an electronic phenomenon linked with the difference of potential Vbe between the base and the emitter of the transistor T, also called conduction threshold of said transistor. When the potential of the base of the transistor (VR2) is higher than the conduction threshold Vbe (generally Vbe=0.6 volt), the transistor T conducts according to the conduction condition of the transistor T. When this potential is lower than Vbe, the transistor will be blocked depending on the reverse blocking condition.

These conditions are actually verified in FIG. 4. As long as VR2<Vbe, the transistor T is blocked and the voltage on the collector is equal to Vbat. The value of R2, fixed by the element 30, remains constant, an augmentation of the supply voltage Vbat causes the value of the voltage VR2 to augment. When VR2>Vbe, the transistor T will be conductive and the voltage on the collector will become substantially zero.

The device has been arbitrarily programmed so that during the charging of the battery, a zero voltage at the collector (T conducts) triggers an interruption of the control element 30 and that during the discharging, an interruption is triggered when the voltage on the collector is close to Vbat (T blocked). The interrupt port of the control element 30 is thus normally active at the high logic level during the discharging of the battery and at the low logic level during charging.

Thus, according to circuit 37, the value of the voltage VR2 on the terminals of R2 determines the interrupt thresholds of the control element 30 representing the detection thresholds of the supply voltage Vbat. The principle of the invention thus consists of fixing the value of the resistance of R2 as a function of the threshold of the supply voltage which one wishes to detect. Therefore, the element 30 utilizes its control output CMD.

Figure 5:
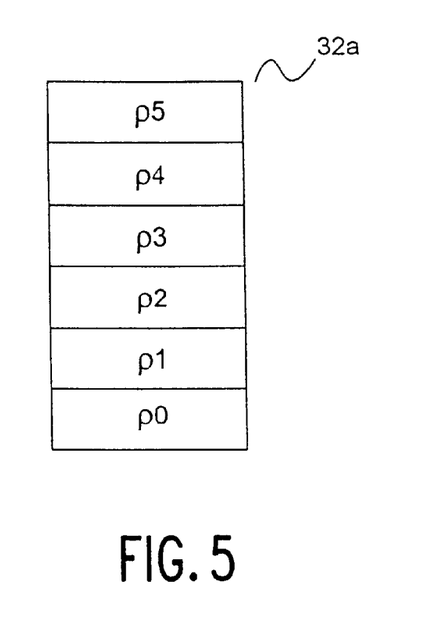
FIG. 5 represents the table 32a of the EEPROM 32 indicated in FIG. 3.

In the example of table 32a represented in FIG. 5, the resistance of the element R2 could only assume set values ρ0 to ρ5, in a logical order as a function of the previously detected thresholds, that is to say, in an order of decreasing values during the charging and increasing values during the discharging. The largest value of the table 32a which can be given to the resistance of R2 corresponds to the overload threshold (detected via the value ρ0) and the lowest value to the power cut off threshold (detected via the value ρ5). The table 32a contains as many set values as there are thresholds to be detected for generating a respective interruption of the control element 30 and triggering an interrupt program.

The following table gives examples of digital values which correspond to the set values ρ0 to ρ5 according to the preferred embodiment of the invention. The digital values have been obtained by taking for R2 a 100-adjustment-step potentiometer DS1804 NV by Dallas Semiconductor and for R1 a 400 kohm resistor. The voltage Vbat and the resistance of R2 are indicated in volts and kohm, respectively. The number of steps of the potentiometer is a unitless number between 0 and 100 according to the manufacturer's specification.

| Vbat | 5.5 | 5 | 4.5 | 4 | 3.5 | 3 |
|------|-----|-----|------|------|------|------|
| R2 | 48.98 | 54.54 | 61.54 | 70.59 | 82.76 | 100 |
| Step | 43 | 49 | 57 | 67 | 80 | 100 |
| Set | ρ0 | ρ1 | ρ2 | ρ3 | ρ4 | ρ5 |

Figure 6A:
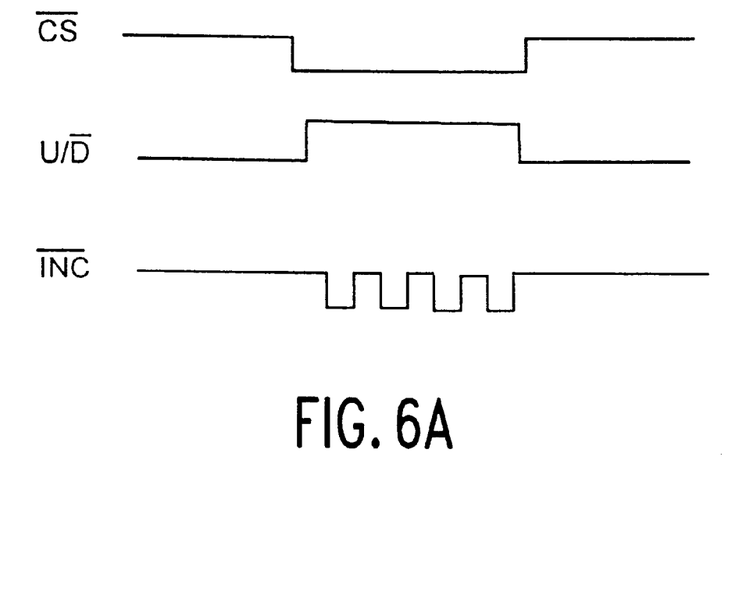
FIG. 6A shows a timing diagram illustrating the logic states of three ports of the element R2 represented in FIG. 4, for enhancing the value of the resistance of R2.
Figure 6B:
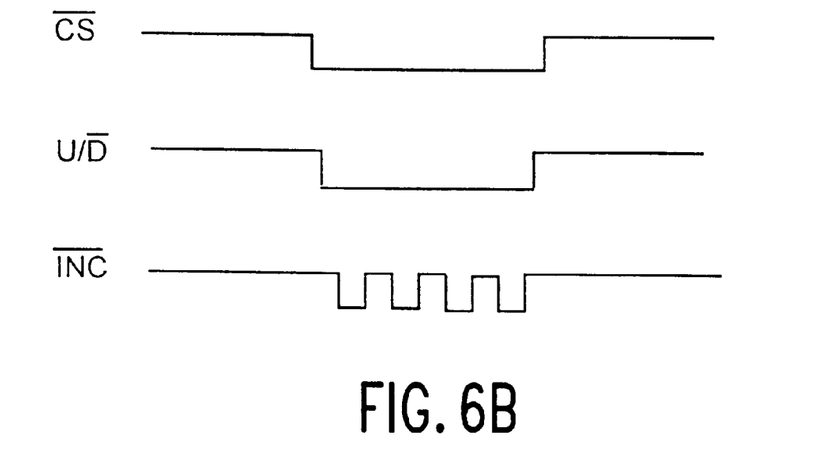
FIG. 6B shows a timing diagram illustrating the logic states of these three gates, for diminishing the value of the resistance of R2.

The programming of R2 takes place by specific buses connecting the output CMD of the control element 30 formed by three output ports to three input ports of R2 denoted $\overline{INC}$, U/$\overline{D}$ and $\overline{CS}$ respectively, while reference is made to FIGS. 6A and 6B. FIG. 6A shows a timing diagram of the states of the three ports mentioned above for augmenting the value of the resistance of R2 in four steps. FIG. 6B shows the states of these ports for diminishing said value in three steps. $\overline{CS}$ is placed at the low logic level to modify the value of the resistance of R2. To increase this value, U/$\overline{D}$ is at the high level and to diminish this value, U/$\overline{D}$ is at the low level. $\overline{INC}$, which is active at the low level, is used for increasing or diminishing the value of the resistance of R2 step by step.

An interruption IT of the control element 30 is generated during the charging and discharging of the battery upon detection of each voltage threshold that corresponds to a set value. Depending on the detected set value, an interrupt program cuts off the power supply (detection at ρ5), stops the charging (detection at ρ0), or indicates a supply voltage level (detection at ρ1, ρ2, ρ3 or ρ4).

Any device that permits of the transmission of a specific message to the user can be used according to the invention to indicate the supply voltage level. For example, if the apparatus has a control screen as in the example shown in FIG. 3, the supply voltage level can be indicated by a display device which permits of displaying on screen 12 an icon 12a or a particular message which symbolizes the charging/discharging level of the battery 11. The icon 12a, which continues to be displayed on the screen, represents bars which are suitable for appearing on or disappearing from the screen 12 as soon as supply voltage thresholds are detected during the charging and discharging of the battery. If the apparatus has an earphone 14, as in the example shown in FIG. 1, a device emitting a sound signal may also be used for indicating the charging level of the battery.

Figure 7:
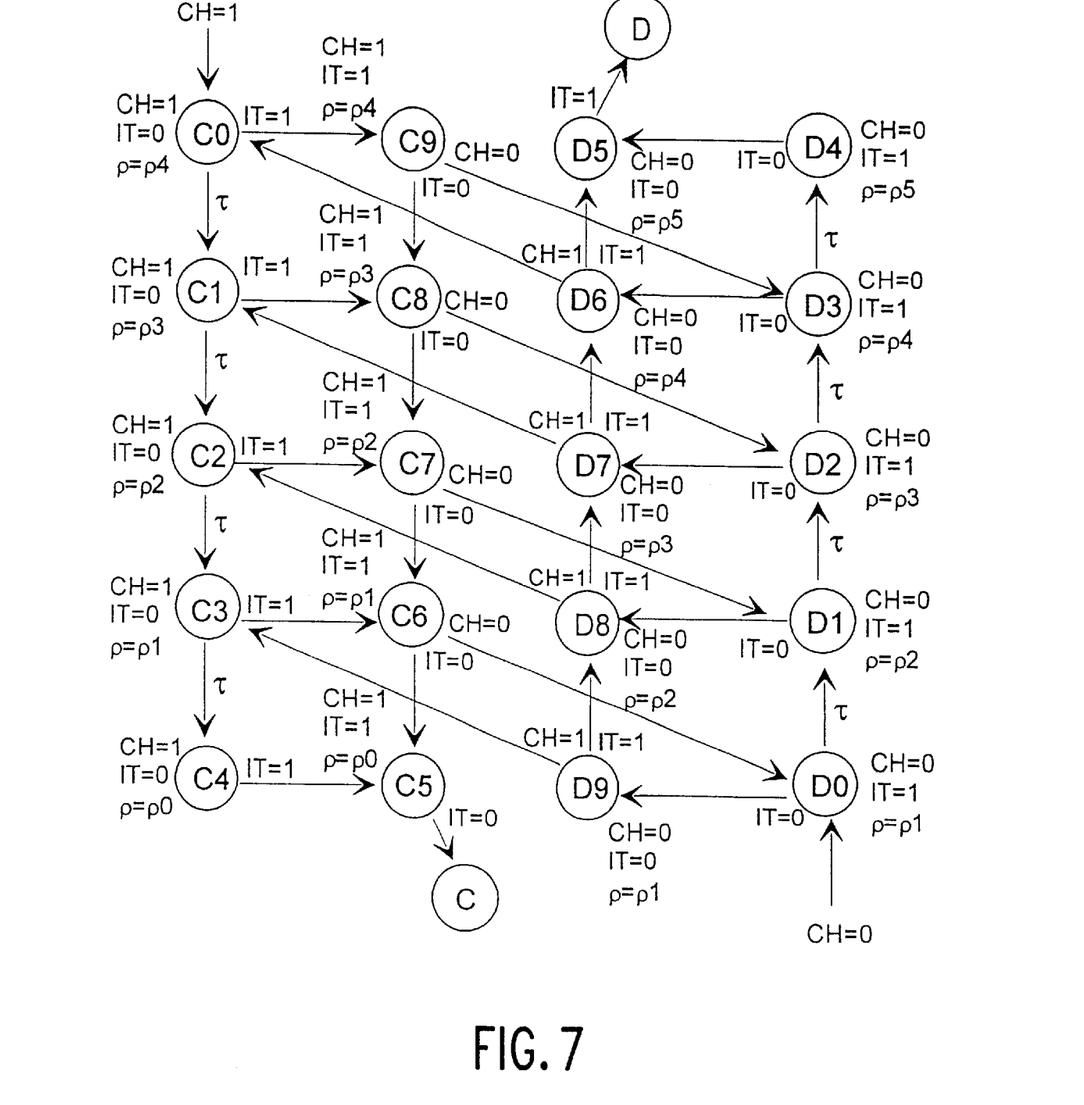
FIG. 7 represents an automaton illustrating the operation of the device shown in FIG. 4

The operation of the supply voltage detection device shown in FIG. 4 will now be described with reference to FIG. 7.

The automaton comprises twenty stable states which represent various states of the device according to the invention, determined by two binary variables (CH, IT) and one variable (ρ) that is capable of assuming the 6 set values.

Each time the apparatus is switched on while lying on its charger, the main program sets the variables CH=1 and activates the interruption IT by way of exception at the high level (IT normally being active at the low level during the charging) in order to test the charging level of the battery and assign to the resistance of R2 the adequate set value for starting or proceeding with the charging depending on whether the battery is completely discharged or already partly charged.

Therefore, the control element 30 scans the values of the table 32a in decreasing order until an interruption is provoked (active at high level by way of exception). The device thus describes the states C0 to C4 (characterized by a set value ρ4 to ρ0), passing from one state to another when a timing τ, which is sufficient for detecting the possible appearance of an interruption (IT=1), expires, which brings the device to one of the states C5 to C9. The interrupt program then stores the set value ρ0 to ρ4 detected for displaying the charging level of the battery. The interruption is reprogrammed at low level. Then, at each new interruption (IT=0) during the charging (CH=1), the device prescribes the following states according to the order indicated by the arrows. The interrupt program updates the level of the supply voltage and diminishes the set value when it passes from one of the states C6 to C9 to one of the states C5 to C8 or deactivates the charger to stop charging when state C is reached from state C5.

Each time the apparatus is switched on, and when it is removed from its charger, the main program sets the variable CH=0 and activates the interruption IT by way of exception at low level (IT normally being active at high level during the discharging) in order to test the discharging level of the battery and assign the proper set value to the resistance of R2.

Therefore, it scans the set values of the table 32a in growing direction so as to provoke an interruption (by way of exception active at low level). The device thus describes the states D0 to D4 (characterized by a set value ρ1 to ρ5) until an interruption (IT=0) places the device in one of the states D5 to D9. The interrupt program then stores the detected set value ρ1 to ρ5 for displaying the charging level of the battery. The interruption is reprogrammed at high level. Then, with each new interruption (IT=1) during the discharging (CH=0), the device describes the following states in the order indicated by the arrows. The interrupt program updates the supply voltage level and increases the set value when passing from one of the states D6 to D9 to one of the states D5 to D8 or cuts off the power supply when passing from the state D5 to the state D.

According to an advantage of the invention, it is also possible to switch from the discharge mode (CH=0) to the charge mode (CH=1), and vice versa, without affecting the whole process of the start of the charging or discharging intended to assign the correct set value to the resistance of R2. It is sufficient to place the variable CH=0 for passing to the discharge mode from the charging states C6 to C9, or place the variable CH=1 for passing to the charge mode from the discharging states D6 to D9. The resistive element R2 retains its set value ρ1 to ρ4, the charging level of the battery is stored and the interruption IT is reprogrammed at the adequate logic level (low by way of exception for switching to the discharge mode, high by way of exception for switching to the charge mode).

Figure 8:
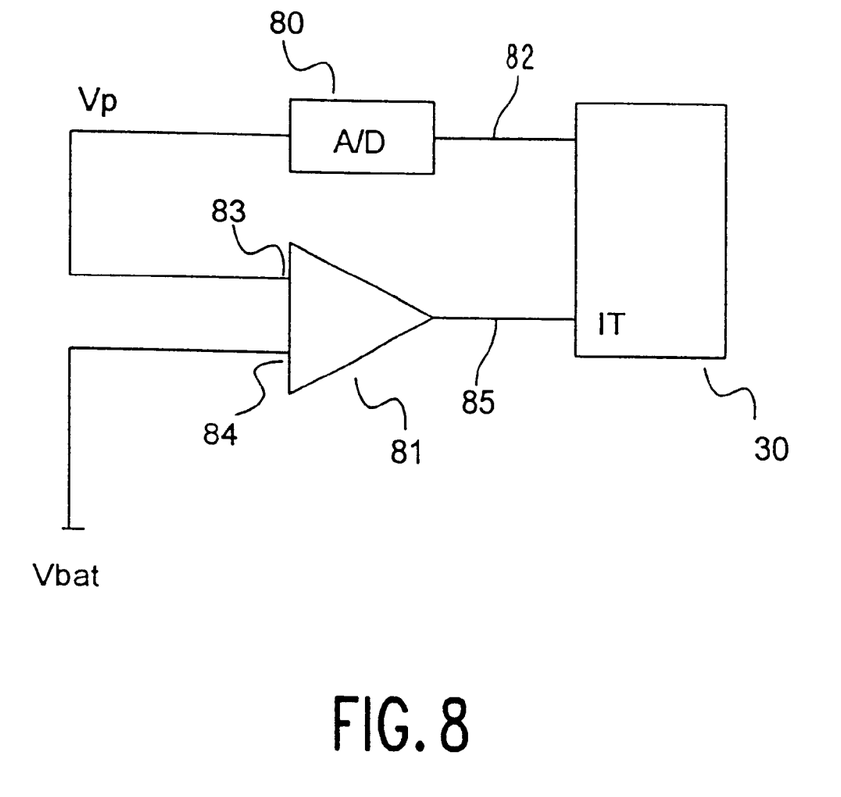
FIG. 8 illustrates another embodiment of the device according to the invention.

Another embodiment of the invention is shown in FIG. 8 in the form of a simplified electronic circuit. It comprises the control element 30, a digital/analog converter 80 and a comparator 81.

The control element 30 computes and stores in the table 32a the set values corresponding to the voltage thresholds one wishes to detect. It transmits the values via its output 82 to the digital/analog converter 80 to convert them into voltage thresholds to be detected Vp, which can be comprehended by the other analog elements of the circuit. As in the device described with reference to FIG. 4, the element 30 sets the voltages Vp in a logical order to follow the charging/discharging of the battery. The comparator 81 compares the voltages Vp and the supply voltage Vbat applied to its inputs 83 and 84 respectively, to generate an interruption IT of the control element 30 as a function of the result 85 of the comparison. If Vp=Vbat, an interruption IT is generated for producing the signal which indicates that the supply voltage Vbat exceeds a detection threshold.

Thus, an electronic apparatus is described comprising a simple and economic supply voltage detection device capable of instantaneously detecting the crossing of a threshold of a supply voltage to cut off the power supply without modifying digital data, indicate at any moment the charge level of the power supply battery and stop the charging if there is an overload.

Obviously, the invention is not restricted to the embodiments that have just been described and represented. Other variants of embodiments of the invention will be obvious to a person of ordinary skill in the art, which variants do not lie outside the scope of the invention. For example, the arrangement of the resistive elements R1 and R2 for forming the voltage divider bridge may be modified. Also the transistor T could be replaced by any other switching device.

What is claimed is:

1. An electronic device a comprising:
   a power source which supplies a supply voltage to said electronic device;
   a memory which stores data corresponding to threshold values;
   a controller which is connected to a collector of a transistor to monitor said supply voltage, said controller controlling a variable resistor connected to base of said transistor to switch said transistor when said supply voltage reaches said threshold values;
   said controller changing said variable resistor to increase said threshold values when said power source is being charged, and to decrease said threshold values when said power source is being discharged.

2. The electronic device of claim 1, wherein said controller changes said variable resistor using said data stored in said memory.

3. The electronic device of claim 1, wherein said data stored in sid memory includes settings of said variable resistor corresponding to said threshold values.

4. The electronic device of claim 1, wherein said data stored in said memory includes settings of said variable resistor from low to high values corresponding to high to low levels of said threshold values.

5. The electronic device of claim 1, wherein said threshold values includes at least three values.

6. The electronic device of claim 1, wherein said electronic device is a radio telephone.

7. An electronic device a comprising:
   a power source which supplies a supply voltage to said electronic device;
   a memory which stores data corresponding to threshold values;
   a comparator which compares said supply voltage with desired thresholds selected from said threshold values;
   a controller which monitors an output of said comparator and selects said desired thresholds in response to said output; said desired thresholds being selected from an increasing order of said threshold values when said power source is being charged, and being selected from a decreasing order of said threshold values when said power source is being discharged.

8. The electronic device of claim 7, wherein said controller stops charging of said power source when said supply voltage reaches a maximum one of said threshold values.

9. The electronic device of claim 7, wherein said controller turns off said electronic device when said supply voltage reaches a minimum one of said threshold values.

10. The electronic device of claim 7, wherein said controller outputs a level of said supply voltage when said supply voltage reaches one of said threshold values.

11. The electronic device of claim 7, wherein said threshold values are provided to said controller on a single line.

12. The electronic device of claim 7, wherein said threshold values includes at least three values.

* * * * *